United States Patent
Song et al.

(10) Patent No.: US 9,255,212 B2
(45) Date of Patent: Feb. 9, 2016

(54) ACETOACETYL-FUNCTIONAL SILICON-BASED RESIN AND PROCESS FOR PREPARING THE SAME

(71) Applicant: Valspar Sourcing, Inc., Minneapolis, MN (US)

(72) Inventors: Niu Song, Foshan (CN); Gang Duan, Northbrook, IL (US); Wen Jinsong, Foshan (CN)

(73) Assignee: VALSPAR SOURCING, INC., Minneapolis, MN (US)

( * ) Notice: Subject to any disclaimer, the term of this patent is extended or adjusted under 35 U.S.C. 154(b) by 0 days.

(21) Appl. No.: 14/170,204

(22) Filed: Jan. 31, 2014

(65) Prior Publication Data
US 2015/0218414 A1    Aug. 6, 2015

(51) Int. Cl.
*C09D 167/02*    (2006.01)
*C07F 7/08*    (2006.01)

(52) U.S. Cl.
CPC .................................. *C09D 167/02* (2013.01)

(58) Field of Classification Search
None
See application file for complete search history.

(56) References Cited

FOREIGN PATENT DOCUMENTS

| CN | 10-3242533 A | * | 8/2013 |
| WO | WO 2011/003349 A1 | * | 1/2011 |

* cited by examiner

*Primary Examiner* — Robert Harlan
(74) *Attorney, Agent, or Firm* — Shumaker & Sieffert, P.A.

(57) ABSTRACT

An acetoacetyl-functional silicon-based resin includes at least a fraction with a branched molecular skeleton containing silicon atoms and acetoacetyl functional groups chemically bonded to the branched molecular skeleton. The acetoacetyl functional silicon-based resin can be used to formulate coating compositions.

14 Claims, No Drawings

ACETOACETYL-FUNCTIONAL SILICON-BASED RESIN AND PROCESS FOR PREPARING THE SAME

BACKGROUND

Coating compositions are widely applied to a variety of products for use in residential, commercial, and industrial applications. Many wood products, such as furniture, flooring, frames, decks, stairs, fences, and the like typically include coatings that provide protective and/or aesthetic qualities to the underlying wood materials. The use of such coatings can increase the endurance and weathering resistance of the wood products, thereby extending the useful lives of the products.

Silicon containing resins such as silicones have been widely used in the coating industry. The silicon containing resins may be used to provide lowered surface tension, improved heat, weathering and erosion resistances, flexibility and other properties for coating compositions. Silicon containing resins may be used with resin binders such as alkyd, polyesters, epoxy resins, or any other polymeric binders that may be suitably used for coating compositions, thereby imparting desired properties to the coating compositions or coatings formed therefrom.

SUMMARY

The present disclosure relates to an acetoacetyl-functional silicon-based resin and a process for the preparation thereof. The present disclosure also relates to coating compositions including the acetoacetyl-functional silicon-based resin.

In one aspect, the present disclosure provides an acetoacetyl-functional silicon-based resin, including at least a fraction with a branched molecular skeleton containing silicon atoms and acetoacetyl functional groups chemically bonded to the branched molecular skeleton.

In some embodiments, the acetoacetyl-functional silicon-based resin may have a hydroxyl value of less than 10 mg KOH/g resin. In some embodiments, the acetoacetyl-functional silicon-based resin includes the silicon atoms in an amount of at least 3.5 wt %, relative to the total weight of the acetoacetyl-functional silicon-based resin. In some embodiments, the acetoacetyl-functional silicon-based resin includes the acetoacetyl functional groups in an amount of at least 25 wt %, relative to the total weight of the acetoacetyl-functional silicon-based resin.

In another aspect, the present disclosure provides a process for the preparation of an acetoacetyl-functional silicon-based resin, the process including: i) reacting a silane compound having three or more condensable functional groups with at least one polyol in excess by condensation, thereby forming a silicon-based resin; and ii) functionalizing the silicon-based resin with an acetoacetyl functional compound, to form the acetoacetyl-functional silicon-based resin.

In still another aspect, the present disclosure provides a coating composition, including the acetoacetyl-functional silicon-based resin as disclosed herein, a polymeric binder, and optionally a curing agent and additional additives.

In various embodiments, the acetoacetyl-functional silicon-based resin of this disclosure may include a fraction with a branched molecular skeleton containing silicon atoms, and acetoacetyl functional groups chemically bonded to the branched molecular skeleton. Therefore, in some embodiments the acetoacetyl-functional silicon-based resin may be used in applications where it is desirable to lower surface tension and there is a need for chemically absorbing pollutant bearing aldehyde, carbonyl, amino groups or the like, thereby reducing or eliminating the detrimental effects of pollutant on the environment or human health. Additionally the branched molecular skeleton of the acetoacetyl-functional silicon-based resin enables more acetoacetyl groups to be attached to the skeleton as terminal or pendent groups, and hence a higher content of acetoacetyl groups in the silicon-based resin. In some embodiments, this ensures the acetoacetyl-functional silicon-based resin can be effective even at a relatively low loading of the resin.

Furthermore, the acetoacetyl-functional silicon-based resin described herein can be manufactured in a simple and cost effective process.

The details of one or more embodiments of the invention are set forth in the description below. Other features, objects, and advantages of the invention will be apparent from the description, and from the claims.

DETAILED DESCRIPTION

As used herein, "a", "an", "the", "at least one", and "one or more" are used interchangeably. Thus, for example, a coating composition that comprises "an" additive can be interpreted to mean that the coating composition includes "one or more" additives.

Throughout the present disclosure, where compositions are described as having, including, or comprising specific components or fractions, or where processes are described as having, including, or comprising specific process steps, it is contemplated that the compositions or processes as disclosed herein may further comprise other components or fractions or steps, whether or not, specifically mentioned in this disclosure, as along as such components or steps do not affect the basic and novel characteristics of the invention, but it is also contemplated that the compositions or processes may consist essentially of, or consist of, the recited components or steps.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, within a range includes every point or individual value between its end points even though not explicitly recited. Thus, every point or individual value may serve as its own lower or upper limit combined with any other point or individual value or any other lower or upper limit, to recite a range not explicitly recited.

As used herein, the term, "acetoacetyl", refers to the group having the following formula:

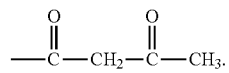

As used herein, the term, "the molar equivalent ratio of the polyol of the silane compound having three or more condensable functionalities," refers to the molar ratio of the hydroxyl groups of the polyol to the condensable functional groups of the silane compound.

The terms "preferred" and "preferably" refer to embodiments of the invention that may afford certain benefits, under certain circumstances. However, other embodiments may also be preferred, under the same or other circumstances.

Furthermore, the recitation of one or more preferred embodiments does not imply that other embodiments are not useful, and is not intended to exclude other embodiments from the scope of the invention.

Acetoacetyl Functional Silicon-Based Resin

In one aspect, the present disclosure is directed to an acetoacetyl-functional silicon-based resin, including at least a fraction with a branched molecular skeleton containing silicon atoms and acetoacetyl functional groups chemically bonded to the branched molecular skeleton. The acetoacetyl-functional silicon-based resin may contain fractions having a wide distribution of molecular weights and molecular skeletons containing at least silicon atoms. In various embodiments, the acetoacetyl-functional silicon-based resin as disclosed herein may have a number average molecular weight in a range of 700 to 20,000 g/mol, 1000 to 20,000 g/mol, or 3000 to 20,000 g/mol.

In one embodiment, the acetoacetyl-functional silicon-based resin contains at least 3.5% by weight of silicon relative to the total weight of the acetoacetyl-functional silicon-based resin. In various embodiments, the silicon concentration of the acetoacetyl-functional silicon-based resin is at least 4.9 wt %, at least 5.4 wt %, at least 7.2 wt % or more, relative to the total weight of the acetoacetyl-functional silicon-based resin. In various embodiments, the silicon concentration of the acetoacetyl-functional silicon-based resin is 8.9% or less, 6.6% or less, or even 6.1% or less by weight relative to the total weight of the acetoacetyl-functional silicon-based resin.

The silicon concentration of the resin can be evaluated as follows:

$$C_{Si}(\% \text{ by weight}) = n \times M_{Si}/W_{resin}$$

where $C_{Si}$ represents the silicon concentration, n the total molar amount of silicon atoms contained in monomers for preparing the resin, $M_{Si}$ the molar mass of the silicon atom, and $W_{resin}$ the total weight of the resin as prepared.

In some embodiments, the silicon concentration falling within the ranges above is sufficient to provide the acetoacetyl-functional silicon-based resin with a desirable surface tension. In particular, the acetoacetyl-functional silicon-based resin as disclosed herein may have a surface tension ranging from about 24 to 28 mN/m.

The acetoacetyl-functional silicon-based resin may contain other elements such as carbon, oxygen, and nitrogen in the molecular skeleton. Preferably, the molecular skeleton contains —Si—O— structural units and as well carbon atoms. As disclosed herein, the inventive acetoacetyl-functional silicon-based resin includes at least a fraction with a branched molecular skeleton containing silicon atoms and acetoacetyl functional groups chemically bonded to the branched molecular skeleton. In some embodiments, the branched molecular skeleton has more than one branch.

In various embodiments, the acetoacetyl-functional silicon-based resin may have a hydroxyl value of less than 10 mg KOH/g resin, less than 7 mg KOH/g resin, less than 5 mg KOH/g resin, or about 0 mg KOH/g resin, as measured according to GB/T 12008.2009. The hydroxyl groups contained in the acetoacetyl-functional silicon-based resin provide the resin with suitable reactivity with hydroxyl reactive functional groups contained in one or more other component such as a curing agent (e.g., polyisocyanates), a polymeric binder, or a filler present in coating compositions. This leads to coatings having improved mechanical properties and endurance.

In various embodiments, the acetoacetyl-functional silicon-based resin may suitably include the acetoacetyl functional groups in an amount of at least 25% by weight relative to the total weight of the acetoacetyl-functional silicon-based resin, at least 32%, at least 42%, or at least 53%, or at least 54% by weight relative to the total weight of the acetoacetyl-functional silicon-based resin. In various embodiments, higher concentrations of the acetoacetyl functional groups in the acetoacetyl-functional silicon-based resin are preferred, but should not exceed 54% by weight relative to the total weight of the acetoacetyl-functional silicon-based resin. The concentration of acetoacetyl functional groups in the acetoacetyl-functional silicon-based resin can conveniently evaluated as follows:

$$C_{aceto}(\% \text{ by weight}) = n \times M_{aceto}/W_{resin}$$

where $C_{aceto}$ represents the concentration of acetoacetyl functional groups, n the total molar amount of acetoacetyl functional groups contained in acetoacetyl functional compounds for preparing the resin, $M_{aceto}$ the molar mass of the acetoacetyl functional group, and $W_{resin}$ the total weight of the resin as prepared.

In various embodiments, the concentration of acetoacetyl functional groups falling within the range as mentioned above can be sufficient to achieve the desired effects associated with the acetoacetyl groups even at a relatively low loading of the resin.

According to the present disclosure, at least a portion of the acetoacetyl functional groups are chemically bonded to the branched molecular skeletons of the acetoacetyl-functional silicon-based resin. Preferably, the acetoacetyl functional groups are covalently bonded to the branched molecular skeletons of the acetoacetyl-functional silicon-based resin, and more preferably via an ester linkage.

Preparation of Acetoacetyl Functional Silicon-Based Resin

In another aspect the present disclosure is directed to a process for the preparation of an acetoacetyl-functional silicon-based resin, comprising at least a fraction comprising a branched molecular skeleton containing silicon atoms and acetoacetyl functional groups chemically bonded to the branched molecular skeleton. The process as disclosed herein comprises: i) reacting a silane compound having three or more condensable functionalities with at least one polyol in excess by condensation, thereby forming a silicon-based resin; and ii) functionalizing the silicon-based resin with an acetoacetyl functional compound, to form the acetoacetyl functional silicon-based resin.

As used herein, the term "silane compound having three or more condensable functionalities" refers to silane compounds having three or more condensable functional groups attached to one or more silicon atoms in the silane compound. The condensable functional group can be released from the silicon atom when the silane compound is exposed to alcohol. The polyol is provided in excess relative to the silane compound having three or more condensable functionalities. In various embodiments, if the molar equivalent ratio of the polyol to the silane compound is in a range of more than 1.0:1 to 4.0:1, a hydroxyl-functional silicon-based resin having a hydroxyl value of at least 400 mg KOH/g resin, at least 410 mg KOH/g resin, or at least 420 mg KOH/g resin may be obtained.

The reaction of the silane compound having three or more condensable functionalities with a polyol leads to chain growth, producing a product including a branched molecular skeleton. In particular, the branched molecular skeleton includes —Si—O— structural units and as well the structural units derived from the polyol.

Suitable examples of the condensable functional groups include, but are not limited to, alkyloxy groups, alkenyloxy groups, aryloxy groups, alkanoyloxy groups, arylacyloxy groups, alkyl ketoximine groups and aryl ketoximine groups.

In some embodiments, the silane compound having three or more condensable functionalities has the structure represented by the following general Formula (I):

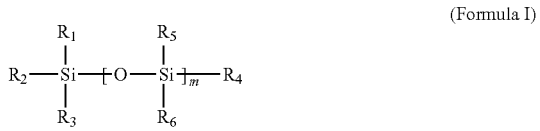

(Formula I)

wherein,
- $R_1$, $R_2$ and $R_3$ are each independently selected from the group consisting of $C_1$-$C_6$ alkyloxy groups, $C_2$-$C_6$ alkenyloxy groups, $C_6$-$C_{10}$ aryloxy groups, $C_1$-$C_6$ alkanoyloxy groups, $C_6$-$C_{10}$ arylacyloxy groups, $C_1$-$C_6$ alkyl ketoximine groups and $C_6$-$C_{10}$ aryl ketoximine groups, with $R_1$, $R_2$ and $R_3$ being the same or different;
- $R_4$ is selected from the group consisting of $C_1$-$C_6$ alkyl, $C_2$-$C_6$ alkenyl, allyl, and $C_6$-$C_{10}$ aryl, or selected from the group consisting of $C_1$-$C_6$ alkyloxy groups, $C_2$-$C_6$ alkenyloxy groups, $C_6$-$C_{10}$ aryloxy groups, $C_1$-$C_6$ alkanoyloxy groups, $C_6$-$C_{10}$ arylacyloxy groups, $C_1$-$C_6$ alkyl ketoximine groups and $C_6$-$C_{10}$ aryl ketoximine group;
- $R_5$ and $R_6$ are each independently selected from the group consisting of $C_1$-$C_6$ alkyl and $C_6$-$C_{10}$ aryl; and
- m is an integer of 0 to 4.

In various embodiments, the silane compound having three or more condensable functionalities includes tetramethoxy silane, tetraethoxy silane, tetrapropyloxy silane, tetrabutoxy silane, methyltriacetyloxy silane, methyl tri(methylethylketoxime) silane, methyl trimethoxy silane, methyl tri(isopropenyloxy) silane, aminopropyl triethoxy silane, glycidyloxypropyl trimethoxy silane, α-monomethyl, ω-trimethoxy polydimethylsiloxane, α-monomethyl, ω-triethoxy polydimethylsiloxane, α-monomethyl, ω-tripropyloxy polydimethylsiloxane, or combination thereof. More preferably, the silane compound is selected from the group consisting of tetramethoxy silane, tetraethoxy silane, tetrapropyloxy silane, tetrabutoxy silane, and combinations thereof.

As a suitable examples of the polyol, ethylene glycol, propylene glycol, 1,2-propanediol, 1,3-propanediol, 1,4-butanediol, 1,5-pentanediol, 1,6-hexanediol, diethylene glycol, dipropylene glycol, triethylene glycol, tetraethylene glycol, neopentyl glycol, 2,2,4-trimethyl-1,3-pentanediol, cyclohexanediol, cyclohexanedimethanol, 2,2-dimethyl-3-hydroxypropyl 2,2-dimethyl-3-hydroxypropionate, bisphenol A, bisphenol F, bisphenol S, 1,3-butylethylpropanediol, 2-methyl-1,3-propanediol, cyclohexanedimethanol, glycerol, trimethylolethane, trimethylolpropane, tripropylene glycol, 1,4-benzyldimethanol, 1,4-benzyldiethanol, 2,4-dimethyl-2-ethylhexane-1,3-diol, 1,4-cyclohexanediethanol, hydroquinone, phenylenedimethanol, resorcinol, naphthalenediol, anthracene-1,10-diol, tris(2-hydroxyethyl) cyanurate, or any combination thereof, can be used.

The suitable conditions for the reaction carried out in step i) are dependent on a variety of factors including the type of silane compound or polyol used, the presence and type of catalyst and so on, and may determined empirically by a person skilled in the art.

In one non-limiting embodiment provided as a example, tetrabutoxy silane is used as the silane compound having three or more condensable functionalities and ethylene glycol as the polyol. Preferably, in step i) of the embodiment, tetrabutoxy silane is reacted with ethylene glycol at an elevated temperature with or without the presence of catalyst. The tetrabutoxy silane and ethylene glycol are fed in such a respective amount that the molar equivalent ratio of the ethylene glycol to the silane compound is in a range of more than 1.0:1 to 4.0:1, preferably in a range of more than 1.0:1 to 3.0:1, more preferably in a range of more than 1.5:1 to 2.5:1, and most preferably in a range of more than 1.7:1 to 1.9:1.

Without wishing to be bound by any theory, presently available evidence indicates that in the embodiment wherein tetrabutoxy silane is used as the silane compound and ethylene glycol is the polyol, step i) of the process includes the reaction illustrated by scheme A as follows:

Scheme A

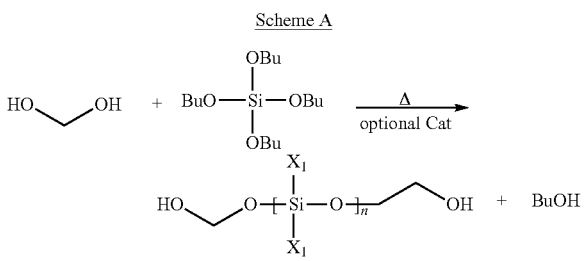

wherein
$X_1$ at each occurrence is independently selected from —O—$CH_2CH_2$—OH and

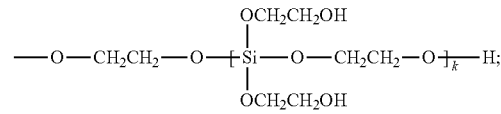

n at each occurrence represents independently an integer from 1 to 10; and
k at each occurrence represents independently an integer from 1 to 10.

In various embodiments, the reaction is carried out at an elevated temperature of 120 to 180° C. in the absence of any catalyst and additional solvent. The reaction mixture may be kept at the elevated temperature for a sufficient time until the silane compound is completely consumed, producing a silicon-based resin which comprises at least a fraction of the formula as shown in Scheme A.

The product, i.e., the silane-based resin produced from step i) may be directly used as it was in step ii) of the process.

In step ii) of the process, the silicon-based resin from step i) is functionalized with an acetoacetyl functional compound to form the acetoacetyl-functional silicon-based resin.

As a suitable example of the acetoacetyl functional compound, allyl acetoacetate, ethyl acetoacetate, t-butyl acetoacetate, diketene, derivatives thereof, and combinations thereof may be given. In various non-limiting embodiments, the acetoacetyl functional compound is selected from allyl acetoacetate, ethyl acetoacetate, t-butyl acetoacetate, and combinations thereof. In some embodiments, ethyl acetoacetate is used as the acetoacetyl functional compound. In various embodiments, the acetoacetyl functional compound reacts with the silane-based resin bearing hydroxyl groups via transesterification, thereby attaching acetoacetyl functional groups to the molecular skeletons of the silane-based resin as terminal groups or pendent groups.

In various embodiments, the acetoacetyl functional compound is supplied to functionalize the silicon-based resin in an amount sufficient to provide a concentration of acetoacetyl functional groups of 32 wt % or more, in particular 42 wt % or more in the acetoacetyl-functional silicon-based resin.

The suitable conditions for the reaction carried out in step ii) are dependent on a variety of factors including the type of silicon-based resin or acetoacetyl functional compound used, the presence and type of catalyst and so on, and may determined empirically by a person skilled in the art.

In one non-limiting embodiment, the ethyl acetoacetate is used to functionalize the silicon-based resin, which is preferably produced from the reaction of tetrabutoxy silane with ethylene glycol in excess, as described above.

Without wishing to be bound by any theory, presently available evidence indicates that in the embodiment as mentioned above, step ii) of the process includes the reaction illustrated by scheme B as follows:

Scheme B

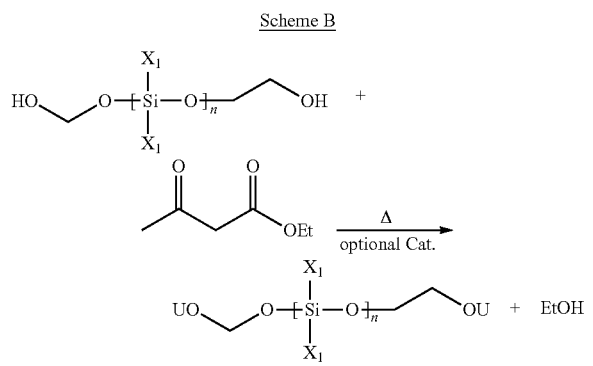

wherein $X_1$ at each occurrence is independently selected from —O—CH$_2$CH$_2$—OU and

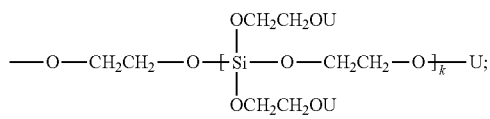

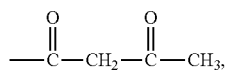

U at each occurrence represents independently H or provided that not all the Us are H;
  n at each occurrence represents independently an integer from 1 to 10; and
  k at each occurrence represents independently an integer from 1 to 10.

In various embodiments, the reaction is carried out at an elevated temperature of 110 to 180° C. in the absence of any catalyst and additional solvent. The reaction mixture may be kept at an elevated temperature for a sufficient time until the acetoacetyl functional compound is completely consumed, producing the acetoacetyl-functional silicon-based resin which comprises at least a fraction of the formula as shown in Scheme B.

The acetoacetyl-functional silicon-based resin of this disclosure is obtainable by the process as disclosed herein. In one embodiment, the acetoacetyl-functional silicon-based resin is obtainable by a process herein the acetoacetyl-functional silicon-based resin includes at least a fraction having the following structure of Formula (II):

(Formula II)

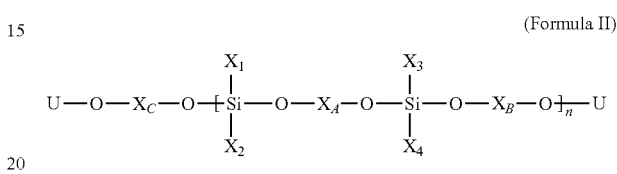

wherein
  $X_1$, $X_2$, $X_3$ and $X_4$ are independently, at each occurrence, selected from —O—$X_A$—O—U, —O—$X_B$—O—U, —O—$X_C$—O—U,

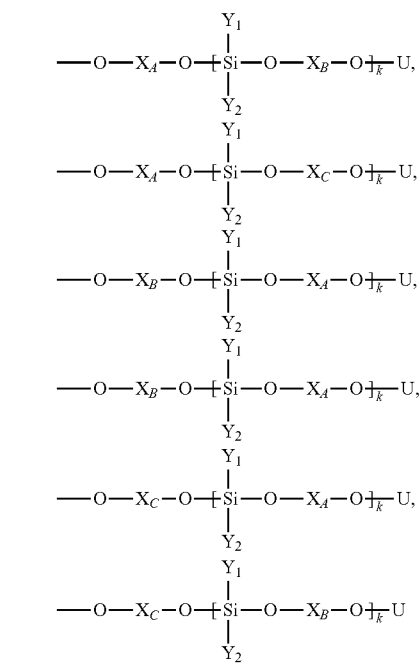

with $Y_1$ and $Y_2$ being independently, at each occurrence, selected from the group consisting of —O—$X_A$—O—U, —O—$X_B$—O—U and —O-Xc-O—U;

$X_A$, $X_B$ and $X_C$ are independently, at each occurrence, selected from the group consisting of —CH$_2$—CH$_2$—,

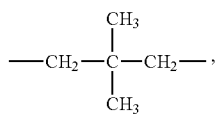

-continued

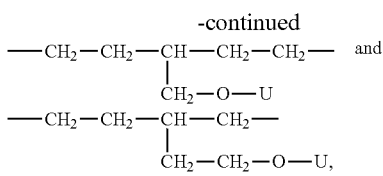

which may be the same or different;

U represents independently, at each occurrence, H or

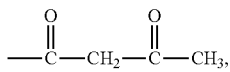

with not all of the Us being H;

n represents independently, at each occurrence, an integer from 1 to 10; and k represents independently, at each occurrence, an integer from 1 to 10.

In various embodiments, the acetoacetyl-functional silicon-based resin is obtainable by a process wherein the acetoacetyl-functional silicon-based resin includes at least a fraction having the following structure of Formula (IIa):

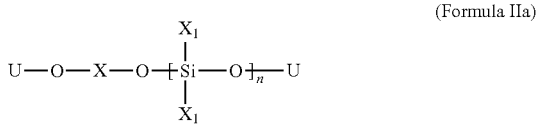

wherein $X_1$ is independently, at each occurrence, selected from —O—X—O—U, and

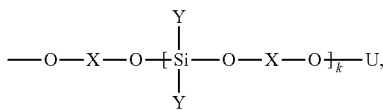

with Y being independently, at each occurrence, —O—X—O—U;

X at each occurrence represents independently $C_{1-10}$ alkylene, preferably —CH$_2$—CH$_2$—;

U represents independently, at each occurrence, H or

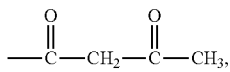

with not all of the Us being H;

n represents independently, at each occurrence, an integer from 1 to 10; and k represents independently, at each occurrence, an integer from 1 to 10.

The acetoacetyl-functional silicon-based resin obtained by the process as disclosed herein can be directly used as-is for the intended application, such as, for example, formulating coating compositions.

Coating Composition

In still another aspect, the present disclosure provides a coating composition, including the acetoacetyl-functional silicon-based resin as disclosed herein, a polymeric binder, and optionally a curing agent and additional additives.

In various non-limiting embodiments, the acetoacetyl-functional silicon-based resin may be used in an amount of 1 to 25%, or 3 to 20%, or 4 to 16%, or 4 to 12% by weight relative to the total weight of the coating composition.

Alkyd resins, epoxy resins, phenolic resin, polyesters, acrylic resins, polyurethanes, or any other polymeric binders suitable for coating compositions may be used. In some embodiments, an alkyd resin is used as the polymeric binder. For example, suitable alkyds may be prepared by polycondensating polyacids or their anhydride, polyols and unsaturated fatty acid; or transesterifying polyols with fatty oil. Alternatively, as examples of alkyd resins, any suitable commercially available product, such as Setal 214 XX-70 from Nuplex Resins, may be used.

In various embodiments, the polymeric binder may be used in an amount of 20 to 96%, or 40 to 90%, or 50 to 80%, or 60 to 80%, or 64 to 76% or 64 to 72% by weight relative to the total weight of the coating composition.

The curing agent can be selected for the polymeric binder used, and suitable examples include, but are not limited to, those containing imine, amine, or isocyanate functionalities.

The coating composition is preferably substantially free, or more preferably free of the curing agent.

The coating composition may further include one or more additional additives. Examples of suitable additives for the coating composition include surfactants, dispersants, waxes, defoaming agents, rheology-modifying agents, colorants (including pigments and dyes), fillers, heat stabilizers, flow/leveling agents, matting agents, sedimentation inhibitors, photostabilizers, biological agents, plasticizers, solvents or combinations thereof.

In one embodiment, the coating composition contains dispersants, waxes, matting agents, leveling agents, defoaming agents and solvents as additional additives. Suitable dispersants include, but are not limited to, BYK 103 from BYK Corporation. Non-limiting examples of waxes include wax powder such as BYK-Ceraflour 950 from BYK Corporation. Examples of matting agents include, but are not limited to, GRACE 7000 from Grace Corporation, Columbia, Md. Non-limiting examples of suitable leveling agents include BYK 358 from BYK Corporation may be used. Suitable solvents include, but are not limited to, xylene, propylene glycol monomethyl ether acetate, butyl acetate, and the like.

In various embodiments, the additional additions may be used in an amount of 0.1 to 25 wt %, or 0.3 to 20 wt %, relative to the total weight of the coating composition.

The coating composition may be applied to a variety of different substrates using conventional application techniques. Examples of suitable substrate materials include wood, cement, cement fiber board, wood-plastic composites, tile, metal, plastic, glass, and fiberglass. In some embodiments, the coating composition may be particularly suitable for use on wood substrates. Suitable wood substrates include substrates derived from wood materials such as oak (e.g., white oak and red oak), pine (e.g., white pine and southern yellow pine), poplar, spruce, cherry, walnut, redwood, cedar, maple, mahogany, birch, hickory, walnut, ash, and the like. Preferred wood materials for the wood substrate include those that exhibit light colors and are susceptible to UV-light discolorations, such as oak, pine, maple, and the like.

The coating obtained from the coating composition as disclosed herein exhibits good weathering resistance, in particular good resistance to UV ray exposure. For example, the coating obtained from the coating composition as disclosed herein on the wood substrate may show yellowing lower than that of the comparable coating composition without the acetoacetyl-functional silicon-based resin by about 20% or more, even by about 40% or more.

EXAMPLES

The present disclosure is more particularly described in the following examples that are intended as illustrations only, since numerous modifications and variations within the scope of the present disclosure will be apparent to those skilled in the art. Unless otherwise noted, all parts, percentages, and ratios reported in the following examples are on a weight basis, and all reagents used in the examples are commercially available, and used directly as they were originally obtained.

Example 1

320.54 g tetrabutoxy silane and 223.45 g ethylene glycol were charged into a four-necked flask equipped with a thermometer, a top stirrer, a gas inlet, and a distilling setup at room temperature. N2 protection was provided by supplying N2 gas through the gas inlet. Then the reaction mixture was heated to about 120° C., and kept at this temperature until some distillate was distilled off. Thereafter the temperature of the reaction mixture was increased to about 180° C. until distillates of butanol were completely distilled off. Thus, a silicon-based resin terminated with hydroxyl groups was prepared, which had a hydroxyl value of 422 mg KOH/g resin.

416.45 g ethyl acetoacetate was further added to the reaction mixture after its temperature was dropped below 80° C. Then the reaction mixture was heated to about 110° C., and kept at this temperature until some distillate was distilled off. Thereafter the heat was increased to heat the reaction mixture to about 180° C., until distillate of ethanol was completely distilled off. The resulting acetoacetyl-functional silicon-based resin was prepared as a bright yellow viscous liquid, which was found to have a viscosity of 627.4 mPa·s as measured by rotational viscometer at 25° C., and surface tension of 24.10 mN/m as measured by surface tension meter through ring detachment method.

Example 2

Coating compositions were prepared by mixing the acetoacetyl-functional silicon-based resin prepared by Example 1 and the alkyl resin prepared by conventional methods, to form a resin component of the coating composition, and further sequentially adding to the resin component xylene, propylene glycol monomethyl ether acetate, dispersant BYK 103, wax powder BYK-ceraflour 950, matting agent CRACE 7000, leveling agent BYK-358, defoaming agent BYK-071 and butyl acetate, with stirring, thereby obtaining a dispersed mixture with desired homogeneity. The amounts of the components are shown in table 1.

The coating compositions were measured for resistance to yellowing under the following test method: the coating samples were prepared from the respective coating compositions, followed by exposure to an UV aging lamp having a radiation intensity of 0.68 W/m² at a speed of 1.5 m/s four times. Then the values of $\Delta b^*$ and $\Delta E^*_{ab}$, which are respectively indicative of yellowing and overall discoloration, were measured for the samples.

The results were shown in Table 1.

TABLE 1

|  | Composition 1 | Composition 2 | Composition 3 | Composition 4 |
|---|---|---|---|---|
| Components |  |  |  |  |
| Silicon-based resin of Example 1 | 4 wt % | 8 wt % | 12 wt % | 16 wt % |
| Alkyd resin | 76 wt % | 72 wt % | 68 wt % | 64 wt % |
| Xylene | 0.3 wt % | 0.3 wt % | 0.3 wt % | 0.3 wt % |
| Propylene glycol monomethyl ether acetate | 0.3 wt % | 0.3 wt % | 0.3 wt % | 0.3 wt % |
| BYK-103 | 2.6 wt % | 2.6 wt % | 2.6 wt % | 2.6 wt % |
| BYK-Ceraflour 950 | 0.5 wt % | 0.5 wt % | 0.5 wt % | 0.5 wt % |
| GRACE 7000 | 3.5 wt % | 3.5 wt % | 3.5 wt % | 3.5 wt % |
| BYK-358 | 0.3 wt % | 0.3 wt % | 0.3 wt % | 0.3 wt % |
| BYK-071 | 5.0 wt % | 5.0 wt % | 5.0 wt % | 5.0 wt % |
| Butyl acetate | 7.5 wt % | 7.5 wt % | 7.5 wt % | 7.5 wt % |
| Total | 100 wt % | 100 wt % | 100 wt % | 100 wt % |
| Properties |  |  |  |  |
| $\Delta b^*$ | 5.04 | 4.28 | 4.13 | 3.74 |
| $\Delta E'_{ab}$ | 5.22 | 4.45 | 4.26 | 3.86 |

As shown in Table 1, the coating compositions containing the acetoacetyl-functional silicon-based resin as disclosed herein provided a coating with improved resistance to yellowing caused by exposure to UV light.

The invention claimed is:

1. An acetoacetyl functional silicon-based resin comprising at least a fraction comprising a branched molecular skeleton with silicon atoms and acetoacetyl functional groups chemically bonded thereto, wherein the fraction has the following structure of Formula (II):

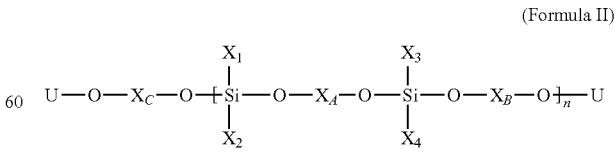

(Formula II)

wherein $X_1$, $X_2$, $X_3$ and $X_4$ are independently, at each occurrence, selected from $-O-X_A-O-U$, $-O-X_B-O-U$, $-O-X_C-O-U$,

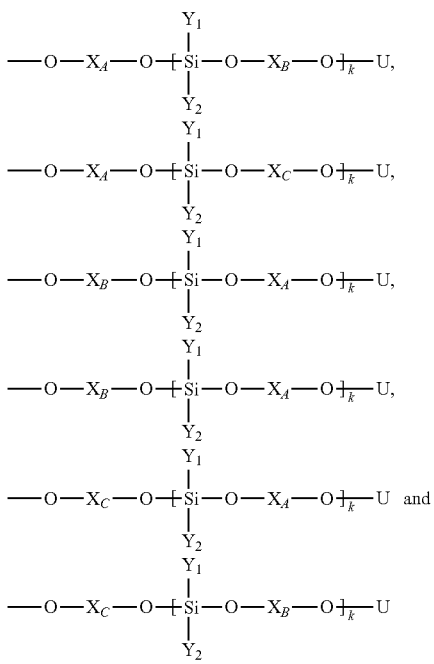

with $Y_1$ and $Y_2$ being independently at each occurrence, selected from the consisting of —O—$X_A$—O—U, —O—$X_B$—O—U and —O—$X_C$—O—U;

$X_A$, $X_B$ and $X_C$ are independently, at each occurrence, selected from the group consisting of —$CH_2$—$CH_2$—,

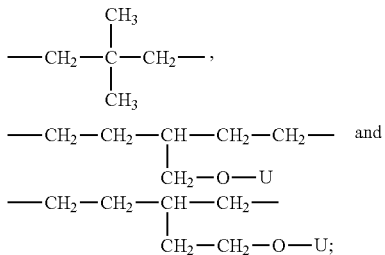

U represents independently, at each occurrence, H or

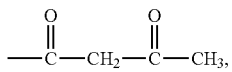

with not all of Us being H;

n represents independently, at each occurrence, an integer from 1 to 10; and k represents independently, at each occurrence, an integer from 1 to 10.

2. The acetoacetyl functional silicon-based resin according to claim 1, wherein the acetoacetyl functional silicon-based resin has a hydroxyl value of less than 10 mg KOH/g resin.

3. The acetoacetyl functional silicon-based resin according to claim 1, wherein the acetoacetyl functional silicon-based resin comprises silicon atoms in an amount of at least 3.5 wt %, relative to the total weight of the acetoacetyl functional silicon-based resin.

4. The acetoacetyl functional silicon-based resin according to claim 1, wherein the acetoacetyl functional silicon-based resin comprises acetoacetyl functional groups in an amount of at least 25 wt %, relative to the total weight of the acetoacetyl functional silicon-based resin.

5. The acetoacetyl functional silicon-based resin according to claim 1, wherein the acetoacetyl functional silicon-based resin is obtained by:

a) reacting a silane compound having three or more condensable functionalities with at least one polyol in excess by condensation, thereby forming a silicon-based resin; and b) functionalizing the silicon-based resin formed in step a) with an acetoacetyl functional compound, to form the acetoacetyl functional silicon-based resin.

6. The acetoacetyl functional silicon-based resin according to claim 5, wherein the silane compound having three or more condensable functionalities has the structure represented by the following Formula (I):

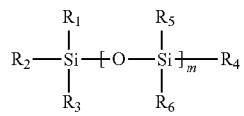

(Formula I)

wherein, $R_1$, $R_2$ and $R_3$ are each independently selected from the group consisting of $C_1$-$C_6$ alkyloxy groups, $C_2$-$C_6$ alkenyloxy groups, $C_6$-$C_{10}$ aryloxy groups, $C_1$-$C_6$ alkanoyloxy groups, $C_6$-$C_{10}$ arylacyloxy groups, $C_1$-$C_6$ alkyl ketoximine groups and $C_6$-$C_{10}$ aryl ketoximine groups, with $R_1$, $R_2$ and $R_3$ being the same or different;

$R_4$ is selected from the group consisting of $C_1$-$C_6$ alkyl, $C_2$-$C_6$ alkenyl, allyl, and $C_6$-$C_{10}$ aryl, or selected from the group consisting of $C_1$-$C_6$ alkyloxy groups, $C_2$-$C_6$ alkenyloxy groups, $C_6$-$C_{10}$ aryloxy groups, $C_1$-$C_6$ alkanoyloxy groups, $C_6$-$C_{10}$ arylacyloxy groups, $C_1$-$C_6$ alkyl ketoximine groups and $C_6$-$C_{10}$ aryl ketoximine group;

$R_5$ and $R_6$ are each independently selected from the group consisting of $C_1$-$C_6$ alkyl and $C_6$-$C_{10}$ aryl; and m is an integer of 0 to 4.

7. The acetoacetyl functional silicon-based resin according to claim 5, wherein the silane compound having three or more condensable functionalities comprises tetramethoxy silane, tetraethoxy silane, tetrapropyloxy silane, tetrabutoxy silane, methyltriacetyloxy silane, methyl tri(methylethylketoxime) silane, methyl trimethoxy silane, methyl tri(isopropenyloxy) silane, aminopropyl triethoxy silane, glycidyloxypropyl trimethoxy silane, α-monomethyl,ω-trimethoxy polydimethylsiloxane, α-monomethyl,ω-triethoxy polydimethylsiloxane, α-monomethyl,ω-tripropyloxy polydimethylsiloxane, or combinations thereof.

8. The acetoacetyl functional silicon-based resin according to claim 5, wherein the silane compound having three or more condensable functionalities comprises tetramethoxy silane, tetraethoxy silane, tetrapropyloxy silane, tetrabutoxy silane or combinations thereof.

9. The acetoacetyl functional silicon-based resin according to claim 5, wherein the polyol is selected from ethylene glycol, propylene glycol, 1,2-propanediol, 1,3-propanediol, 1,4-butanediol, 1,5-pentanediol, 1,6-hexanediol, diethylene glycol, dipropylene glycol, triethylene glycol, tetraethylene glycol, neopentyl glycol, 2,2,4-trimethyl-1,3-pentanediol, cyclohexanediol, cyclohexanedimethanol, 2,2-dimethyl-3- hydroxypropyl 2,2-dimethyl-3-hydroxypropionate, bisphenol A, bisphenol F, bisphenol S, 1,3-butylethylpropanediol, 2-methyl-1,3-propanediol, cyclohexanedimethanol, glycerol, trimethylolethane, trimethylolpropane, tripropylene glycol, 1,4-benzyldimethanol, 1,4-benzyldiethanol, 2,4-dimethyl-2-ethylhexane-1,3-diol, 1,4-cyclohexanediethanol, hydroquinone, phenylenedimethanol, resorcinol, naphthalenediol, anthracene-1,10-diol, tris(2-hydroxyethyl) cyanurate, and combinations thereof.

10. The acetoacetyl functional silicon-based resin according to claim 5, wherein the acetoacetyl functional compound is selected from allyl acetoacetates, ethyl acetoacetate, t-butyl acetoacetate, diketene, derivatives thereof, and combinations thereof.

11. The acetoacetyl functional silicon-based resin according to claim 5, wherein the acetoacetyl functional compound comprises ethyl acetoacetate.

12. The acetoacetyl functional silicon-based resin according to claim 1, wherein $X_A$, $X_B$ and $X_C$ are —$CH_2$—$CH_2$—.

13. The acetoacetyl functional silicon-based resin according to claim 1, wherein the acetoacetyl functional silicon-based resin has a number average molecular weight in the range of 700 g/mol to 20,000 g/mol.

14. The acetoacetyl functional silicon-based resin according to claim 1, which has a surface tension of 24 to 28 mN/m.

* * * * *